(12) United States Patent
Borwick, III et al.

(10) Patent No.: US 7,346,981 B2
(45) Date of Patent: Mar. 25, 2008

(54) METHOD FOR FABRICATING MICROELECTROMECHANICAL SYSTEM (MEMS) DEVICES

(75) Inventors: Robert L. Borwick, III, Thousand Oaks, CA (US); Philip A. Stupar, Oxnard, CA (US); Jeffrey F. DeNatale, Thousand Oaks, CA (US); Jun J. Yao, San Diego, CA (US); Sangtae Park, Sugar Land, TX (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 460 days.

(21) Appl. No.: 10/453,031

(22) Filed: Jun. 2, 2003

(65) Prior Publication Data

US 2004/0113513 A1 Jun. 17, 2004

Related U.S. Application Data

(63) Continuation-in-part of application No. 10/213,951, filed on Aug. 7, 2002.

(51) Int. Cl.
*H05K 3/10* (2006.01)

(52) U.S. Cl. .......................... 29/846; 29/825; 29/830; 361/277; 361/278; 361/280; 361/281; 438/689; 438/694; 438/697; 216/11; 216/33; 216/36; 216/80

(58) Field of Classification Search .................. 29/825, 29/830, 846; 361/277, 278, 280, 281; 438/689, 438/694, 697, 700, 706, 745; 216/80, 33, 216/36, 11

See application file for complete search history.

(56) References Cited

U.S. PATENT DOCUMENTS

| 5,578,976 | A |  | 11/1996 | Yao ............................ 333/262 |
| 5,880,921 | A |  | 3/1999 | Tham et al. ................. 361/233 |
| 5,959,516 | A |  | 9/1999 | Chang et al. ................. 334/14 |
| 6,074,890 | A |  | 6/2000 | Yao et al. ...................... 438/52 |
| 6,159,385 | A | * | 12/2000 | Yao et al. ........................ 216/2 |
| 6,188,322 | B1 |  | 2/2001 | Yao et al. ................... 340/664 |
| 6,223,432 | B1 | * | 5/2001 | Dennison et al. ............. 29/846 |
| 6,756,310 | B2 | * | 6/2004 | Kretschmann et al. ...... 438/694 |
| 6,768,628 | B2 | * | 7/2004 | Harris et al. ................ 361/277 |

\* cited by examiner

*Primary Examiner*—Rick K Chang
(74) *Attorney, Agent, or Firm*—Koppel, Patrick, Heybl & Dawson

(57) ABSTRACT

A process for fabricating a MEMS device comprises the steps of depositing and patterning on one side of a wafer a layer of material having a preselected electrical resistivity; bonding a substrate to the one side of the wafer using an adhesive bonding agent, the substrate overlying the patterned layer of material; selectively removing portions of the wafer from the side opposite the one side to define stationary and movable MEMS elements; and selectively removing the adhesive bonding agent to release the movable MEMS element, at least a portion of the layer of material being disposed so as to be attached to the movable MEMS element.

29 Claims, 8 Drawing Sheets

METHOD FOR FABRICATING MICROELECTROMECHANICAL SYSTEM (MEMS) DEVICES

CROSS-REFERENCE TO RELATED APPLICATION

This application is a continuation-in-part of application Ser. No. 10/213,951 filed Aug. 7, 2002, incorporated herein by reference in its entirety.

BACKGROUND OF THE INVENTION

1. Field of the Invention

The present invention relates to microelectromechanical systems (MEMS) devices and methods of fabricating such devices.

2. Description of the Related Art

MEMS comprise a class of very small electromechanical devices that combine many of the most desirable aspects of conventional mechanical and solid-state devices. Unlike conventional electromechanical devices, MEMS can be monolithically integrated with integrated circuitry while providing both low insertion losses and high electrical isolation. Two main categories of MEMS are actuators and sensors. MEMS actuators can be very precise because they perform only a small amount of work on their environment. MEMS sensors are virtually non-invasive because of their small physical size.

MEMS devices typically comprise a fixed element attached to an electrically insulating substrate and a suspended element with a substantial portion free from mechanical attachment to the substrate so as to be movable with respect to the fixed element.

High sensitivity MEMS devices require high aspect-ratio structural, elements. Deep etched structures of about 2 micrometers (μm) wide and from about 20 μm to about 100 μm deep with a narrow spacing, for example, about 2 μm, between adjacent features are often needed to achieve the desired sensitivity. In addition, if, for example, these devices are also required to provide high electrical voltage isolation, an insulating material must be used to electrically isolate and mechanical join various conductive members within the device. Lithography and patterning over the aforementioned high aspect-ratio MEMS devices is thus required, and presents a major challenge in the fabrication of such devices.

For example, U.S. Pat. No. 6,159,385, issued to the assignee of the present invention and incorporated herein by reference for its teachings of a low temperature MEMS fabrication process and various MEMS devices, discloses a high aspect-ratio MEMS device having a movable element such as a cantilevered beam suspended over a first substrate, preferably of glass. A second substrate is fabricated by growing a device layer of doped silicon on a silicon sacrificial or handle layer and depositing a layer of insulating material such as silicon dioxide on the device layer. With the insulating layer in confronting relationship with the glass substrate, the two substrates are joined using an adhesive bonding agent to create a composite structure. The handle layer is then removed exposing the top side of the device layer which is patterned and etched using anisotropic plasma dry etching techniques to define the MEMS elements. This etch stops upon reaching the insulative silicon dioxide layer. A second mask is then applied to pattern the silicon dioxide layer from the top to define an insulating bridge. Finally, an oxygen plasma etch is performed to undercut the adhesive bonding agent and thereby release the movable MEMS element.

The two-mask process described above provides the desired insulating joinder structure or bridge for mechanically coupling and electrically isolating the MEMS elements. It will be noted, however, that, as stated earlier, patterning and etching of the silicon dioxide layer over the deeply etched MEMS structure is required, a process that is difficult to perform with consistent accuracy, resulting in low yields.

SUMMARY OF THE INVENTION

In accordance with one, specific, exemplary embodiment of the present invention, there is provided a MEMS device comprising a substrate and a pair of MEMS elements supported by the substrate. Each of the MEMS elements has (i) a bottom surface facing the substrate, (ii) a top surface and (iii) a side wall, the side walls of the MEMS elements being in spaced-apart, confronting relationship. The bottom surfaces are substantially coplanar and the bottom surface of each of the MEMS elements carries an electrically conductive layer. At least one of the pair of MEMS elements is movable relative to the other MEMS element to vary the spacing between the side walls of the respective MEMS elements.

In one aspect of the invention, one of the pair of MEMS elements is stationary relative to the substrate, and the other of the pair of MEMS elements is movable relative to the stationary element. The said stationary MEMS element may be attached to the substrate by an adhesive bonding agent.

In another aspect of the invention, the movable MEMS element may comprise an electrical contact bar and the stationary element comprises an electrical terminal, the conductive layer on the movable contact bar being positioned to be moved into electrical contact with the conductive layer on the stationary electrical terminal.

In another aspect, the stationary MEMS element may comprise a pair of spaced-apart electrical terminals each carrying a conductive layer, the movable element may comprise an electrical contact bar disposed to bridge the pair of stationary terminals, and the conductive layer on the movable contact bar may be movable into electrical contact with the conductive layers on the stationary terminals to electrically connect the conductive layers on the stationary terminals.

Still further, the stationary MEMS element may comprise a pair of spaced-apart electrical terminals each carrying a conductive layer, the conductive layer on the movable contact bar having one end movable into electrical contact with the conductive layer carried by one of the stationary terminals, the conductive layer on the movable contact further having another end electrically connected to the electrically conductive layer carried by the other of the stationary terminals. The connection between the electrically conductive layers on the movable contact bar and on the other of said stationary terminals may comprises a flexible coupling. Further in this regard, the electrically conductive layer on the movable contact bar, the electrically conductive layer on the other of the stationary terminals and the electrically conductive flexible coupling comprise a unitary, coplanar structure.

In yet another aspect of the invention, each of the electrically conductive layers carried by the MEMS elements has an edge, the edges of the layers being in confronting relationship and separated by a gap whose size varies in response to the movement of the movable MEMS elements relative to the stationary MEMS element. Preferably, the edge of each of the electrically conductive layers overhangs the side wall of the corresponding MEMS element. In this case, the overhanging edges of the electrically conductive layers may comprise switch contacts positioned to make or break electrical contact in response to the movement of the movable MEMS element relative to the stationary MEMS element.

Broadly, methods in accordance with the present invention use a versatile, low temperature, double-sided MEMS fabrication process capable of high yield production of a wide variety of high aspect ratio MEMS devices.

In accordance with one, specific, exemplary embodiment of a method in accordance with the present invention for fabricating a MEMS device including a stationary element and a movable element displaceable relative to the stationary element, the method comprises the steps of depositing and patterning on one side of a wafer a layer of material having a preselected electrical resistivity; bonding a substrate to the one side of the wafer using an adhesive bonding agent, the substrate overlying the patterned layer of material; selectively removing portions of the wafer from the side opposite the one side to define the stationary and movable MEMS elements; and selectively removing the adhesive bonding agent to release the movable MEMS element, at least a portion of the layer of material being disposed so as to be attached to the movable MEMS element.

The wafer preferably comprises a silicon-on-insulator (SOI) structure while the substrate is preferably fabricated of an insulating material such as glass. In accordance with one specific form of the invention, the movable MEMS element includes spaced-apart, conductive members, and the layer of selected resistivity comprises an insulating material such as silicon dioxide. The layer is patterned to define a bridge mechanically coupling and electrically isolating the conductive members of the movable MEMS element.

Pursuant to another specific form of the invention, the layer of selected resistivity comprises an electrically conductive material, preferably gold. In this case, the layer comprising a first portion attached to the movable MEMS element and a second portion attached to the stationary MEMS element, with the first and second portions of the conductive layer being positioned to make electrical contact in response to movement of the movable MEMS element.

In accordance with another specific, exemplary embodiment of the present invention, there is provided a method of fabricating a MEMS device which may, for example, take the form of a hybrid MEMS switch. As before, the MEMS device includes a stationary element and a movable element displaceable relative to the stationary element. The method of this embodiment comprises the steps of depositing and patterning on one side of a wafer, preferably an SOI wafer, a first layer comprising an electrically insulating material, preferably silicon dioxide; depositing and patterning a second layer on the one side of the wafer, the second layer comprising an electrically conductive material; bonding a substrate to the one side of the wafer using an adhesive bonding agent, the substrate overlying the patterned layers; selectively removing portions of the wafer from the side opposite the one side to define the stationary and movable MEMS elements, the movable MEMS element comprising spaced-apart, electrically conductive members; and selectively removing the adhesive bonding agent to release the movable MEMS element, the first patterned layer comprising an insulating bridge mechanically coupling and electrically isolating the spaced-apart members of the movable MEMS element, a first portion of the patterned second layer being attached to the movable MEMS element and a second portion of the patterned second layer being attached to the stationary MEMS element, the first and second portions of the second layer being positioned to make electrical contact with each other in response to movement of the movable MEMS element.

BRIEF DESCRIPTION OF THE DRAWINGS

Further objects, features and advantages of the invention will be apparent to those skilled in the art from the following detailed description, taken together with the accompanying drawings in which.

DETAILED DESCRIPTION OF THE INVENTION

Figure 1:
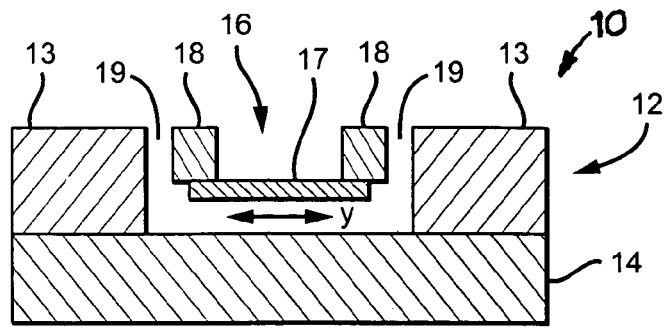
FIG. 1 is an end elevation view, in cross section, of a MEMS device fabricated in accordance with one embodiment of the process of the present invention.

Referring initially to FIG. 1, a simplified, schematic illustration of an example of a high aspect ratio MEMS device 10 that may be fabricated using the low temperature, adhesive bonding process of the present invention that allows for patterning of both the top (or front) side and the bottom (or back) side of a MEMS device layer. The MEMS device 10 includes a stationary MEMS element 12 comprising a pair of stationary outer conductive members 13 extending upwardly from a substrate 14. The substrate 14 may be either conducting or insulating, depending on the intended application. An inner, movable MEMS element 16 is disposed between the pair of stationary members 13, and includes an insulating support or bridge 17 carrying a pair of spaced-apart, electrically conductive members 18 extending upwardly from the bridge. It will be appreciated by those having ordinary skill in the art that the movable MEMS element 16 as shown in FIG. 1 may comprise a cantilever beam supported at one end by a fixed anchor on the substrate 14 so that its opposite end is free to move relative to the substrate and to the stationary members 13 in a direction y. Alternatively, the movable element 16 may comprise a beam that is supported at its distal ends by the substrate 14 such that the middle portion of the element 16 is deflectable in the y direction relative to the substrate 14 and the stationary members 13. The movable MEMS element 16 is separated from the outer two elements 13 by a variable gap 19 on each side of the movable element 16, which, by way of example, could be the gap between the adjacent plates of a detection capacitor.

The MEMS device 10 may perform any function suitable for a MEMS application. For example, the device could comprise an accelerometer whose moveable MEMS element 16 is a beam that deflects in response to an external physical stimulus, such as an acceleration or a vibration of the device 10. Accordingly, as the size of the gaps 19 vary, so will the output capacitance thereby providing a measurement of the deflection of the movable MEMS element 16.

Because the bridge 17 is formed of an insulating material such as silicon dioxide, the conductive members 18, although mechanically coupled together by the bridge 17, will be electrically isolated from each other thereby minimizing the risk that an electrical input will conduct across the device 10, which could jeopardize elements disposed downstream of the MEMS device output.

With reference to FIGS. 2a-2f, a MEMS device such as the device 10 of FIG. 1 may be fabricated in accordance with the following preferred process steps.

Figure 2A:
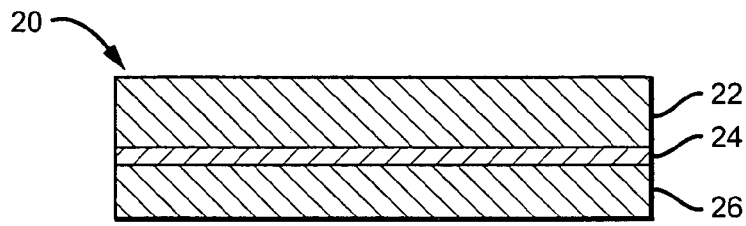
FIGS. 2a through 2f illustrate the steps for fabricating the device shown in FIG. 1.

FIG. 2a shows a wafer 20 preferably comprising a silicon-on-insulator (SOI) wafer including a silicon handle layer 22, a buried silicon dioxide layer 24 and a silicon MEMS device layer 26. The silicon handle and device layers 22 and 26 may be undoped or doped with boron, germanium or other known dopants to impart semiconductor properties. The buried silicon dioxide layer functions as an etch stop. Wafer 20 may comprise a commercially available SOI wafer sold by many manufacturers such as Shin-Etsu Handotai Co., Ltd., Japan, or it may be fabricated using common semiconductor techniques.

It will be obvious to skilled artisans that the wafer 20 may comprise virtually any kind of suitable wafer. For example, instead of an SOI wafer, the wafer 20 may comprise plain (undoped) silicon so that the wafer itself comprises the device layer. Alternatively, a plain silicon wafer may be doped from one side to define a device layer that may also serve as an etch stop. Several examples of suitable wafers are disclosed in incorporated U.S. Pat. No. 6,159,385.

Figure 2B:
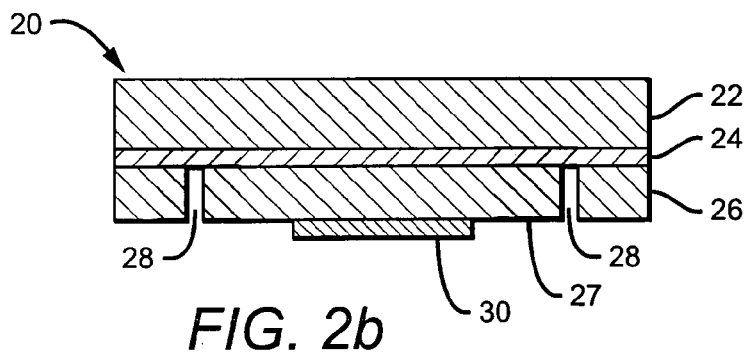

FIG. 2b shows the preferred SOI wafer 20 of FIG. 2a in the next stage of fabrication, with alignment marks 28 etched through the device layer 26. The alignment marks 28 are used to position a bridge 30 formed from a layer of electrically insulating material deposited and patterned on the backside or bottom surface 27 of the device layer 26. The insulating material may comprise, by way of example, silicon dioxide, silicon nitride, aluminum oxide, silicon oxynitride or silicon carbide; silicon dioxide is preferred. Deposition and patterning of the bridge 30 on the bottom surface 27 of the device layer 26 eliminates having to etch the bridge 30 over a tall step from the top surface of the device layer.

The insulating bridge layer may be deposited on the bottom surface of the device layer 26 by any of a variety of processes such as vapor deposition, sputtering, or the like, and then patterned and etched to define the desired structure of the bridge 30. The bridge layer is preferably deposited by chemical vapor deposition (CVD) and more preferably by plasma enhanced chemical vapor deposition (PECVD). The dimensions of the bridge 30 and the materials from which it is fabricated will depend upon the particular application in which the MEMS device is used. By way of example, the bridge 30 may have a length of 230 µm, a width of 200 µm, and a thickness of 1.5 µm.

Figure 2C:
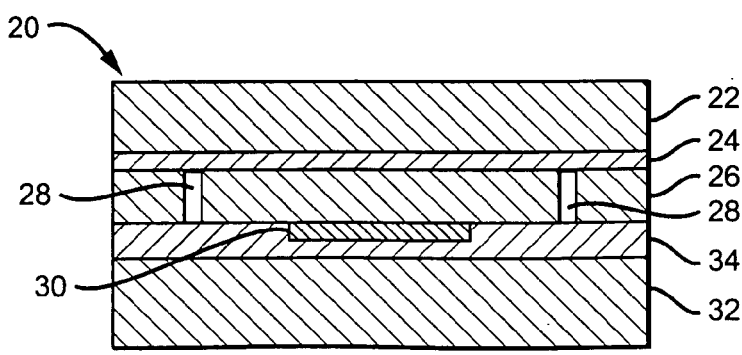

Next, as shown in FIG. 2c, the backside patterned wafer 20 is bonded to a substrate 32 using an adhesive bonding agent 34. The substrate 32 may be either conducting or insulating, depending on the intended application, and may comprise glass, high resistivity silicon, crystalline sapphire, crystalline silicon, polycrystalline silicon, silicon carbide, or ceramic such as alumina, aluminum nitride, and the like, or gallium arsenide. In fact, the substrate may comprise any material suitable for supporting a MEMS device. Substrate 32 is preferably made of an insulating material, such as Vycor® or Pyrex® glass, or a high resistivity silicon. Alternatively, substrate 32 may be formed from a heavily doped semiconductor material to allow for electrical coupling between substrate 32 and wafer 20. Preferably, the coefficient of thermal expansion (CTE) of the substrate is selected to be different from that of the wafer to prestress the substrate end the wafer. Alternatively; the CTEs may be chosen so as to be sufficiently similar to insure that expansion or contraction of the substrate does not damage the wafer, the bond, or the MEMS device during the bonding process, or as a result of temperature changes.

Bonding agent 34 is preferably an organic adhesive or epoxy that is selected and applied as described in the above-mentioned, incorporated U.S. Pat. No. 6,159,385.

The process of the present invention is independent of the substrate material. Since epoxy or organic adhesives will readily bond to a wide variety of substrates, substrates may be selected depending upon the specific application and how the MEMS device will interface with other devices. Furthermore, these adhesives are non-conductive and thus may be used to provide electrical isolation between the substrate and the MEMS device elements and may be utilized where, for example, silicon or gallium arsenide substrates are employed instead of glass.

Figure 2D:
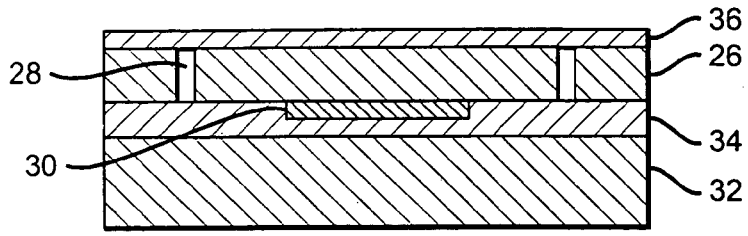

In the next stage of fabrication, illustrated in FIG. 2d, the handle layer 22 and buried insulating layer 24 have been removed, and an electrically conductive connection layer 36, deposited on the device layer 26, has been substituted for the removed layers. The removal of the handle and insulating layers 22 and 24 exposes the alignment marks 28 so that the location of the patterned bridge 30 is known. The removal of the handle layer 22 is preferably accomplished with a wet chemical etch. Insulating layer 24 is preferably removed utilizing a wet etch with hydrogen fluoride (HF). Alternatively, or in combination therewith, the removal of these layers may be accomplished with a dry plasma etch or other semiconductor etching process. As an alternative to etching away the entire handle layer 22, or in combination therewith, portions of handle layer 22 and insulating layer 24 may be removed by a mechanical grind. Accordingly, a wet etch, a dry etch or a mechanical grind can be used by themselves or in any combination.

The conductive connection layer 36 may have a thickness of, for example, 2 µm, and may comprise any metallic conductor that can be deposited or formed using a conventional semiconductor fabrication process such as sputtering or evaporative deposition. The conductive connection layer 36 is preferably aluminum for ease of patterning but may comprise a noble metal, copper, nickel, niobium, titanium, tantalum, and so forth. (The term "noble metal" as used herein is accorded its ordinary definition as comprising gold, silver and the platinum group, namely, platinum, rhodium, palladium, ruthenium, osmium and iridium.) Aluminum is preferred because it can be easily patterned by plasma etching; the remaining metals mentioned are usually patterned using an alternative technique such as a lift-off process.

Figure 2E:
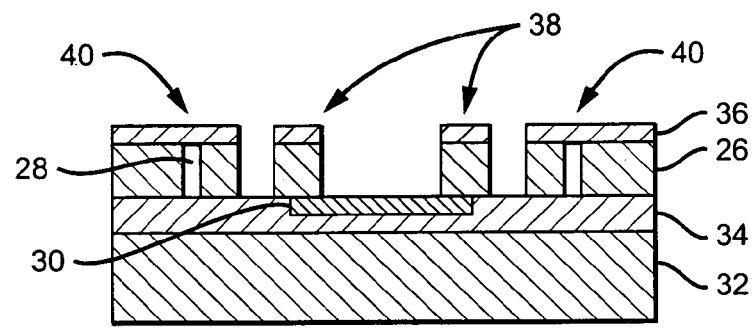

FIG. 2e illustrates the next stage of fabrication, after the patterning and formation of the MEMS elements. The patterning is accomplished using standard photolithographic techniques followed by a conventional semiconductor etch through the conductive connection layer 36 and the device layer 26, to define a pair of spaced-apart, upstanding, parallel members 38 on the insulating bridge 30 and a pair of stationary MEMS elements 40 flanking the members 38. The conductive connection layer 36 (when formed of aluminum) and the silicon device layer 26 may be conveniently patterned using the same mask.

A dry chlorine etch is preferably used to remove selected portions of the conductive connection layer 36; however, other conventional removal or etching techniques may be used. A deep reactive ion etch (DRIE) is preferably utilized to etch the device layer 26. This type of etching creates very uniform, straight, vertical, confronting surfaces on the members 38 and elements 40. Alternatively, other conventional removal or etching techniques, such as RIE, may be used to remove the selected portions of the device layer 26. In any event, a very high aspect ratio may be provided for the members 38, for example of the order of 20:1 to 100:1. Such very narrow, deep sensor elements provide high capacitance values that are easy to detect. The members 38 will be mechanically coupled to each other by the insulating bridge 30 far enough apart to provide high electrical isolation between these members. The distance between the members 38 will depend on the particular application for which the MEMS device is used.

Figure 2F:
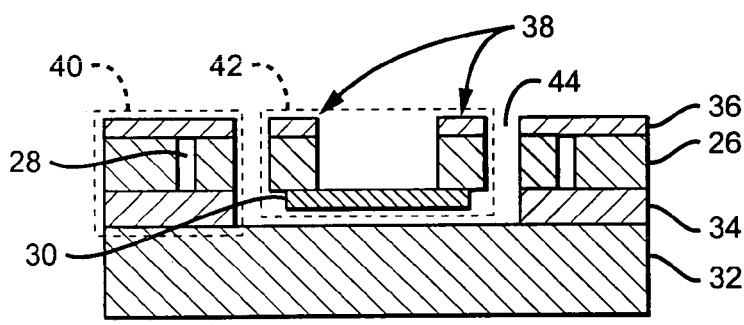

FIG. 2f shows the final stage of fabrication, after the adhesive bonding agent 34 has been selectively etched away to mechanically uncouple or release a movable MEMS element 42 from the substrate 32. The movable MEMS element 42 comprises a unitary structure including the members 38 and the insulating bridge 30 supporting and coupling the electrically isolated members 38. Etching of the adhesive bonding agent 34 is preferably accomplished utilizing an oxygen plasma etch but could be accomplished in other ways including any conventional semiconductor etching technique.

Apertures (not shown) may be formed in the bridge 30, preferably when the bridge is patterned on the wafer 20, to facilitate passage of the etchant to the adhesive bonding agent to accelerate the process of removing the bonding agent.

As explained, the etching away of the adhesive bonding agent releases the inner MEMS element 42 that is movable with respect to the outer, stationary elements 40. The released element 42 may comprise a cantilever beam fixed at one end to the substrate 32. Alternatively, the released element 42 may comprise a simple beam fixed to the substrate 32 at the opposed, distal ends of the beam. The MEMS device of FIG. 2f that is ultimately fabricated may function as an accelerometer, a current sensor, an electrical switch, or a variable capacitor whose deflectable element 42, in response to an external stimulus, moves laterally in relation to stationary elements 40 thereby varying the size of a capacitive gap 44 adjacent each side of the movable element 42. Accordingly, the change in the output capacitance of the MEMS device provides an indication of the magnitude of an applied signal or physical variable such as acceleration. Capacitive gap 44 is preferably 1-5 μm in the rest position of the movable element 42, but may be smaller or larger as required for a particular application.

It may be desirable to provide electronic circuits adjacent to the MEMS device. This may be accomplished by fabricating the circuits directly on the wafer 20 or on the substrate 32 before, during, or after the MEMS fabrication process.

Electrical measurement or instrumentation systems can gain significant benefit from electrically isolating the sensed variable, such as electrical current, from the detection electronics which may comprise, by way of example, capacitance measuring means whose output is a function of the sensed variable. The manufacturability and performance of such systems may be substantially improved utilizing the electrical isolation fabrication process of FIGS. 2a-2f.

Figure 4:
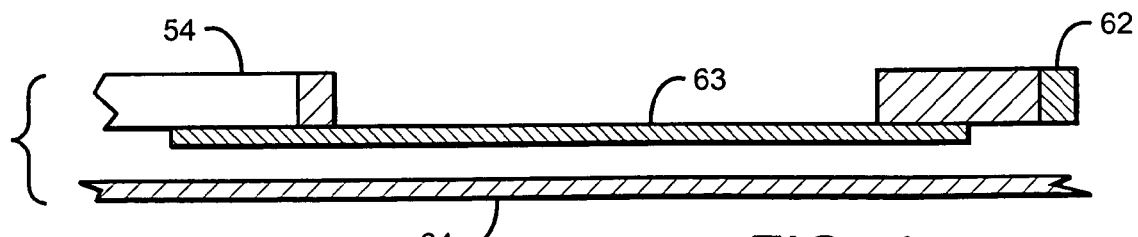
FIG. 4 is a side elevation view, in cross section, of a portion of the MEMS device of FIG. 3 as seen along the line 4-4 in FIG. 3.
Figure 3:
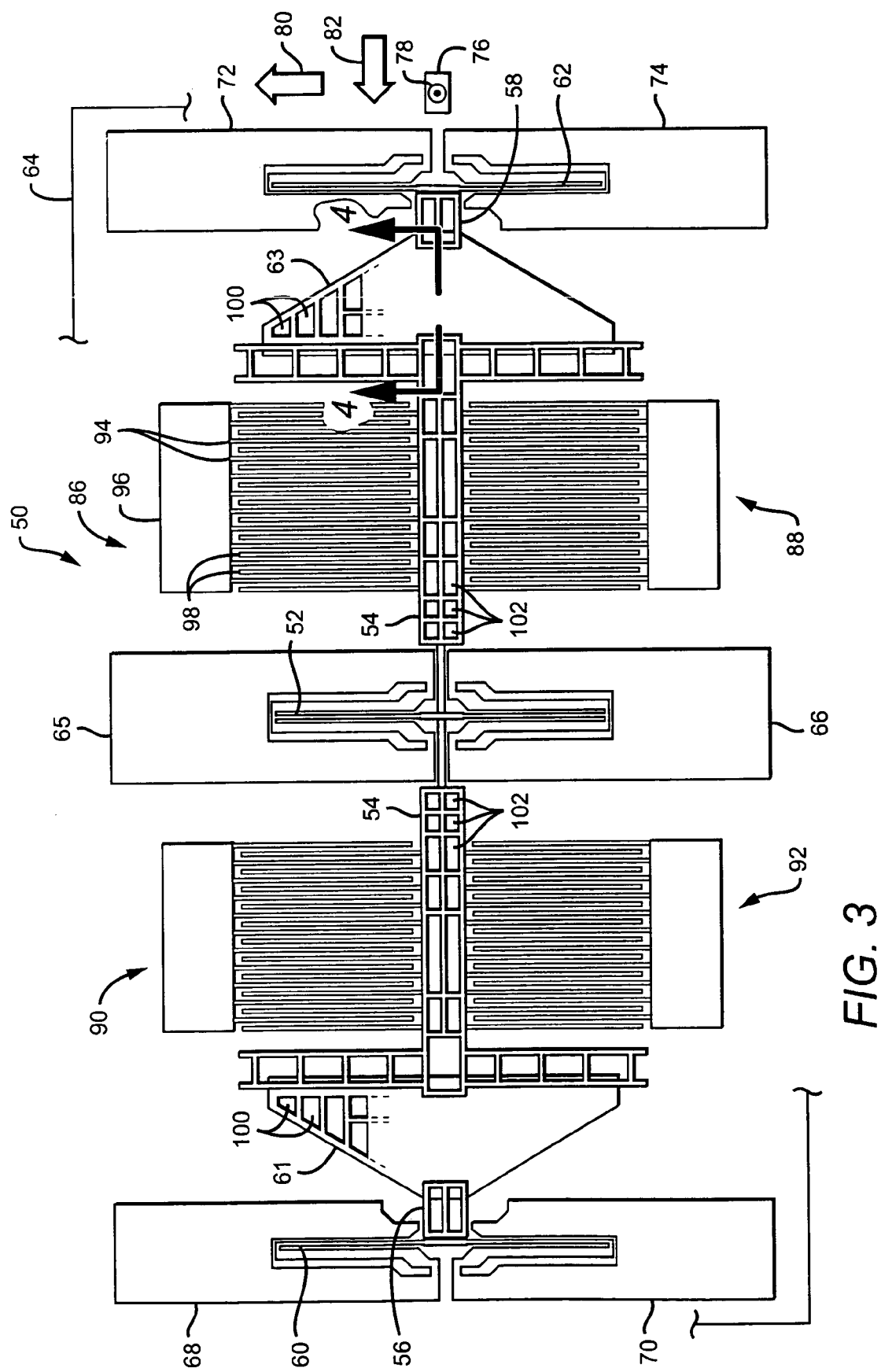
FIG. 3 is a simplified top plan view of a MEMS device in the form of an electrical current sensor fabricated in accordance with the process of FIGS. 2a-2f.

For example, FIGS. 3 and 4 show a practical example of a MEMS device in the form of a MEMS current sensor 50 that may be fabricated utilizing the method of the present invention. Sensor 50 includes a transverse, centrally located, compliant suspension 52 carrying a longitudinally-extending arm 54. The arm 54 includes transverse ends 56 and 58 coupled to compliant, electrically conductive suspension beams 60 and 62, via electrically insulating bridges 61 and 63, respectively, fabricated of, for example, silicon dioxide. With this configuration, the arm 54 and suspensions 52, 60 and 62 are mechanically coupled together to move as a single unit with respect to a substrate 64. The bridges 61 and 63, however, electrically isolate the arm 54 from the electrically conductive suspensions 60 and 62. The suspension 52 is coupled at its opposed outer ends to anchors 65 and 66 affixed to the substrate 64; similarly, the outer ends of suspensions 60 and 62 are coupled to anchor pairs 68, 70 and 72, 74 respectively, affixed to the substrate 64.

A magnetic field source 76, such as a permanent magnet or electromagnet typically disposed above or below the substrate 64, provides a magnetic field represented by a magnetic vector 78.

Connections to one or more external circuits currents through which are to be measured, are made via anchors 68, 70, 72 and 74 carrying the suspensions 60 and 62 to which the anchors are electrically connected. By way of example, if current flows from a connected external circuit through the anchor 72, the suspension 62 and the anchor 74 in the direction indicated by an arrow 80, a Lorentz force causes the arm 54 and the moveable portions of the interconnected compliant suspensions 52, 60 and 62 to move laterally to the left as indicated by the arrow 82 in FIG. 3. When the current flow through the suspension 62 terminates, given the compliance of the suspensions 52, 60 and 62, the arm 54 is thereupon restored to its undeflected or rest state. It will be apparent that reversing the current so that it flows in a direction opposite to that of the arrow 80 will cause displacement of the arm 54 to the right as viewed in FIG. 3. Alternatively, the same result may be achieved by reversing the direction of the magnetic field 78. It will be appreciated that the greater the compliance of suspensions 52, 60 and 62, the less electrical current, or magnetic field strength, or both, will be required to obtain a given displacement of the sensor.

The sensor 50 includes interdigitated or comb sense capacitors 86, 88, 90 and 92 for providing to external output circuits (not shown) signals representing the displacement of the arm 54 from its rest position. A pair of comb capacitors 86 and 88 straddle the arm 54 adjacent to the right end suspension 62. Similarly, a pair of comb capacitors 90 and 92 straddle the arm 54 adjacent to the left end suspension 60. Since the comb capacitors 86, 88, 90 and 92 are identical, only the right hand comb capacitor 86 will be described.

The comb capacitor 86 comprises a plurality of fixed plates 94 cantilevered from a block 96 secured to the substrate 64 and interleaved with a plurality, of movable plates 98 projecting outwardly from the arm 54. The combination of the interleaved stationary and movable plates 94 and 98, appropriately connected to an external output circuit, forms a capacitor. As the current flowing through one of the suspensions such as the suspension 62 varies, the distance arm 54 moves varies, and consequently, the gap between the plates 94 and 98 varies, thus varying the capacitance between them. In this manner, the amplitude of the current flowing through the suspension 62 may be measured by measuring the change in capacitance between the plates 94 and 98.

Fabrication of the MEMS device of FIGS. 3 and 4 generally follows the steps outlined in FIGS. 2a-2f. Thus, the process includes placing the insulative bridges 61 and 63 on a wafer, preferably an SOI wafer, and adhesively bonding the substrate 64 to the bridge side of the wafer. The handle and insulating layers of the wafer are then removed and a conductive connection layer is deposited on the wafer. Next, the device layer of the wafer is patterned, as described earlier, to form the moveable and stationary elements of the device of FIGS. 3 and 4. Last, the bonding agent is removed from beneath the suspensions 52, 60 and 62, the arm 54, arm ends 56 and 58, the bridges 61 and 63, and the movable capacitor plates 98.

With the adhesive bonding agent removed, the arm 54, bridges 61 and 63, suspensions 52, 60, and 62, and the capacitor plates 98 form the moveable MEMS device elements that are displaceable with respect to the stationary MEMS elements 65, 66, 68, 70, 72 and 74, which remain adhesively bonded to the substrate 64.

Except for the bridges 61 and 63, all of the elements of the MEMS device of FIGS. 3 and 4, including the comb capacitors 86, 88, 90 and 92, are fabricated in the silicon device layer, with the metal connection layer on top. The insulating bridges are preferably fabricated from silicon dioxide. The sizes of the stationary portions are predetermined so that a timed etch will undercut the device's movable element but not the larger stationary portions.

Bridges 61 and 63 have apertures 100 to aid in removal of the bonding agent between the bridges and the substrate 64 by allowing an etchant to access the bonding agent through the apertures. The apertures 100 are formed at the same time the bridge is formed and patterned. Similarly, apertures 102 are formed in the arm 54 when the device layer is patterned to form the MEMS elements.

It will be appreciated that the insulative bridges 61 and 63 electrically isolate the input elements, that is, the suspensions 60 and/or 62 through which the current to be measured flows, from the output elements, namely, the comb capacitors 86, 88, 90 and 92. Moreover, all of the advantages gained in the fabrication of the device of FIG. 2f are also attained in the fabrication of the current sensor of FIGS. 3 and 4, and will be realized as well in the fabrication of a broad range of MEMS sensors and actuators.

As noted, the layer deposited and patterned on the backside or bottom surface of the MEMS device layer may have a preselected electrical property. For example, as in the case of the devices of FIGS. 1, 2f, 3 and 4, the layer may comprise an electrical insulator patterned to define a bridge for mechanically coupling two or more conductive members while electrically isolating those members.

Figure 5:
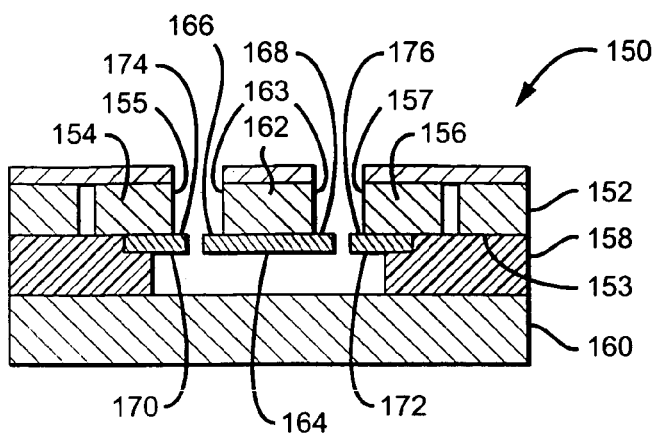
FIG. 5 is an end elevation view, in cross section, of a MEMS device fabricated in accordance with another embodiment of the process of the present invention

Alternatively, the layer may comprise an electrically conductive material such as a metal. In this connection, reference is made to the simplified, schematic representation of a bidirectionally actuatable MEMS switch 150 shown in FIG. 5. The switch 150 is a high aspect ratio MEMS device fabricated using the low temperature, double-sided, adhesive bonding process illustrated in FIGS. 2a-2f that allows for patterning of both the top (or front) side and the bottom (or back) side of a MEMS device layer 152. The device layer has a planar backside or bottom surface 153. The MEMS device 150 includes a stationary MEMS element comprising a pair of stationary outer conductive members 154 and 156 attached by an adhesive bonding layer 158 to a substrate 160. The stationary MEMS members have inner, substantially vertical side walls 155 and 157, respectively. The substrate 160 may be fabricated of a conducting or an insulating material, depending on the ultimate application of the device 150. An inner, horizontally movable MEMS element 162 is disposed between the pair of stationary elements 154, 156. The movable MEMS element 162 has opposed, substantially vertical side walls 163 in spaced-apart, confronting relationship with the side walls 155 and 157 on the stationary elements 154 and 156 and carries along its bottom surface an electrically conductive contact 164 having bilateral contact edges 166 and 168. The contact edges 166 and 168 may be flush with the side walls 163; preferably, however, the contact edges 166 and 168 are overhanging edges, that is, they project outwardly beyond the side walls 163 as shown in FIG. 5. It will be appreciated that the movable MEMS element 162 may comprise a cantilever beam supported at one end by a fixed anchor on the substrate 160 so that its opposite, contact-carrying free end may move horizontally relative to the substrate and to the stationary elements 154 and 156. Alternatively, the movable MEMS element 162 may comprise a beam that is supported at its opposite ends by the substrate so that a middle portion of the element is deflectable in the horizontal direction relative to the substrate and the stationary members. The stationary MEMS elements 154 and 156 carry along their bottom surfaces fixed electrical contacts 170 and 172, respectively, having contact edges 174 and 176 that may be substantially flush with the side walls 155 and 157, respectively, but preferably project beyond or overhang the side walls, as shown. The movable and fixed contact layers are substantially coplanar and are formed by depositing and patterning a metal layer on the bottom surface of the device layer before bonding that layer to the substrate 160. By way of example, the metal layer may comprise any of the noble metals, tantalum, niobium, titanium, copper or aluminum; gold is preferred.

The contact 164 attached to the movable MEMS element is positioned to make and break electrical continuity with either of the fixed contacts 170 and 172 in response to horizontal movement of the movable MEMS element. Using the process of the invention, the contacts 164, 170 and 172 may be readily provided with the preferred overhanging contact edges to compensate for any interfering misalignments of the vertical walls of the adjacent MEMS elements that might prevent electrical contact from being established between the contacts.

As a still further alternative, two or more layers having different electrical properties may be deposited and patterned along the bottom surface or backside of the device layer. For example, a first layer may comprise an electrical insulator while a second layer may comprise an electrical conductor. An example of a MEMS device so structured is shown in FIG. 6, with the process steps that may be used for fabricating such a device illustrated in FIGS. 7a-7f.

Figure 6:
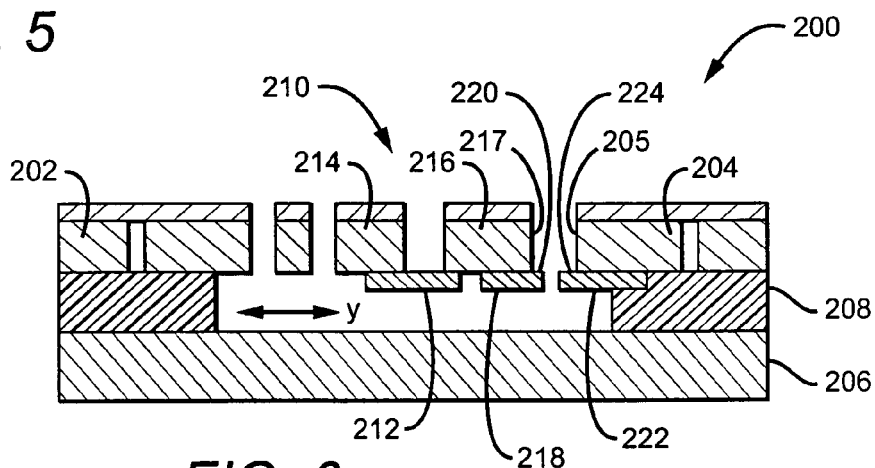
FIG. 6 is an end elevation view, in cross section, of a MEMS device fabricated in accordance with another embodiment of the process of the present invention.

FIG. 6 is a simplified, schematic illustration of a MEMS device 200 in the form of an electrical switch. Except for two additional steps, the process for making the MEMS device of FIG. 6 is identical to that for making the device shown in FIG. 2f. The additional steps comprise the deposition and patterning of an electrically conductive layer, preferably one of the metals, such as gold, listed earlier to define a pair of substantially coplanar electrical switch contacts.

The MEMS device 200 of FIG. 6 includes a pair of stationary outer electrically conductive elements 202 and 204 bonded to a substrate 206 by an adhesive layer 208. An inner, movable MEMS element 210 is disposed between the pair of stationary elements 202 and 204, and includes an insulating support or bridge 212 carrying a pair of spaced-apart, electrically conductive members 214 and 216 extending upwardly from the bridge. By way of example, the movable element 210 may comprise a structure that is supported at its distal ends by the substrate 206 so that the movable element is displaceable in a y direction relative to the substrate and the stationary elements 202 and 204.

As in the case of FIG. 1, because the bridge 212 is formed of an insulating material such as silicon dioxide, the conductive members 214 and 216, although mechanically joined by the bridge, will be electrically isolated from each other.

The lower surface of the movable MEMS element 210 carries a thin metal contact 218 having an edge 220 preferably overhanging the side wall 217; similarly, the lower surface of the stationary MEMS element 204 carries a thin, fixed metal contact 222 coplanar with the movable contact 218 and having an edge 224 preferably overhanging the side wall 205, confronting the edge 220. The metal contacts 218 and 222 are so positioned that the edge 220 of the movable contact will engage the edge 224 of the fixed contact when the movable MEMS element 210 is moved to the right, as seen in FIG. 6.

Figure 7A:
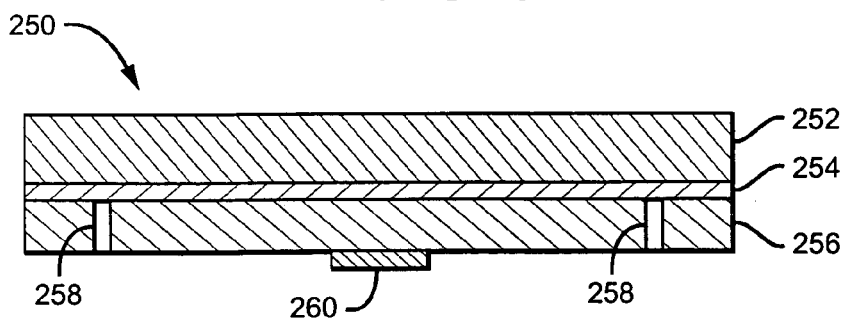
FIGS. 7a through 7f illustrate the steps for fabricating the device of FIG. 6.
Figure 7B:
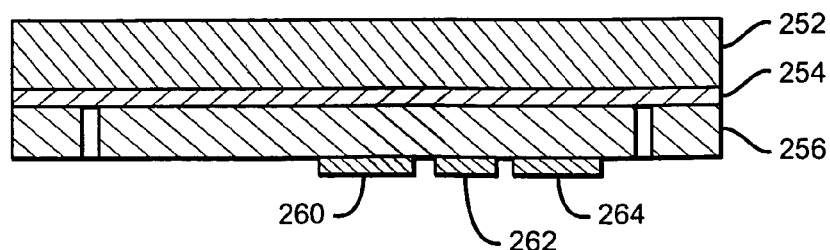

FIGS. 7a-7f illustrate process steps that may be used for fabricating the MEMS device 200; the steps illustrated are nearly identical to those shown in FIGS. 2a-2f. Briefly, there is provided a wafer 250 comprising a handle layer 252, a buried etch stop layer 254, and a device layer 256 (FIG. 7a). As before, the wafer 250 preferably comprises a commercially available SOI wafer although, as indicated earlier, other wafer structures may be utilized. Parallel, spaced-apart alignment marks 258 are etched through the device layer 256. Next, an insulating layer of, for example, silicon dioxide having a thickness of, for example, 1.5 µm, is deposited on the planar bottom surface or backside of the device layer 256 and patterned to define an insulating bridge 260. A metal layer having a thickness of, for example, 1.5 µm, is then deposited on the backside of the device layer 256 and patterned by a liftoff process to define a pair of substantially coplanar contacts 262 and 264. (FIG. 7b.) Although this layer can be any metal that can be deposited by sputtering or evaporative deposition, for example, a noble metal, tantalum, niobium, titanium, nickel, copper or aluminum, it preferably comprises evaporated gold for its desirable electrical contact properties.

Figure 7C:
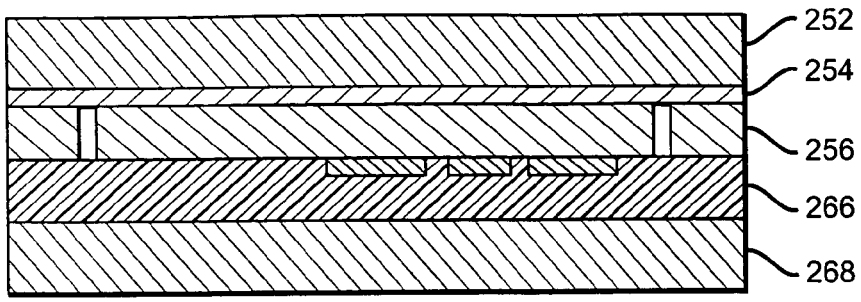
Figure 7D:
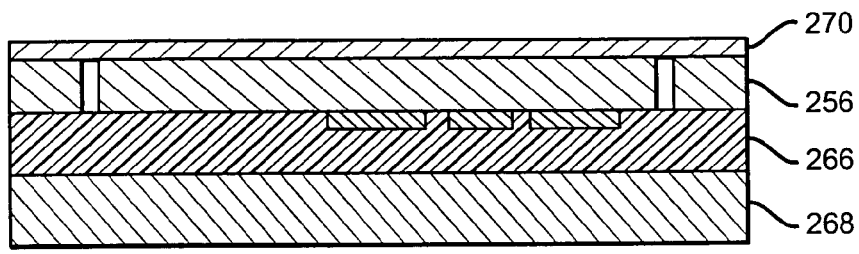
Figure 7E:
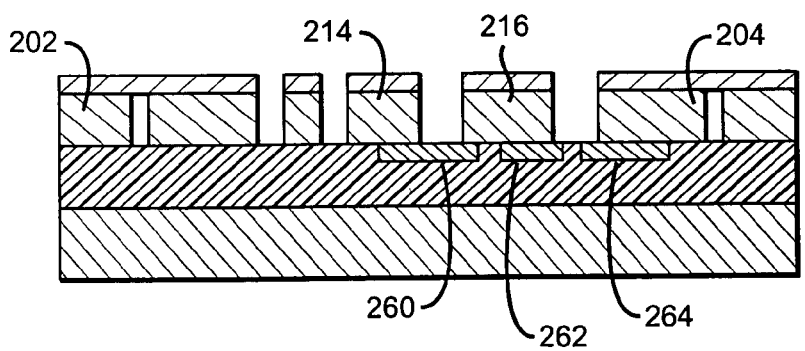
Figure 7F:
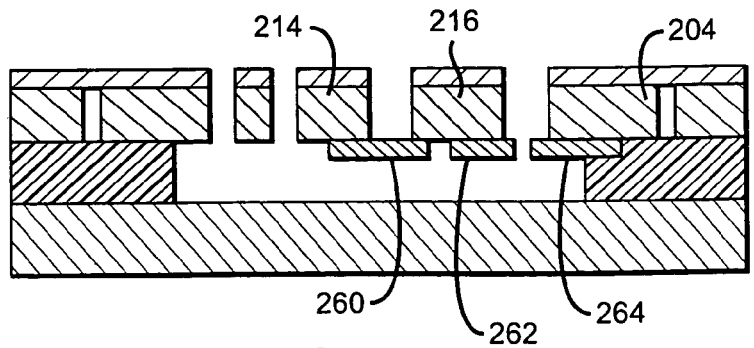
Figure 8:
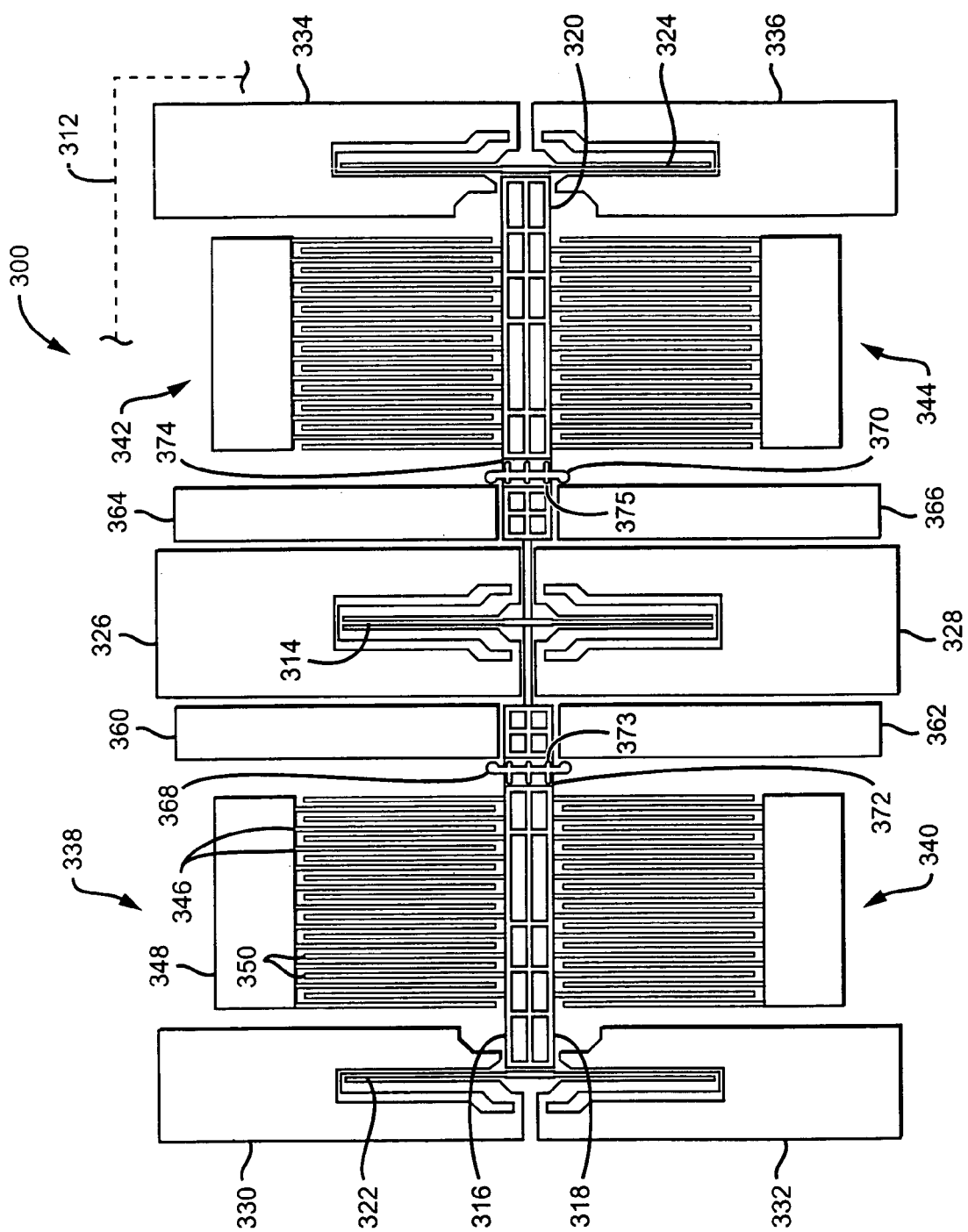
FIG. 8 is a simplified top plan view of a MEMS device in the form of an electrical switch fabricated in accordance with the process of FIGS. 7a-7f.
Figure 9:
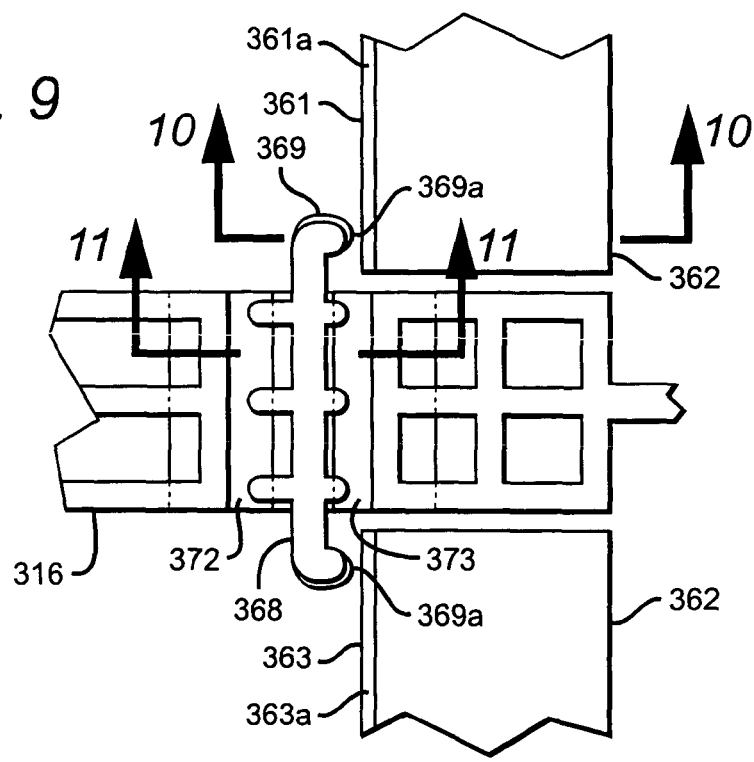
FIG. 9 is an enlarged top plan view of a portion of the device of FIG. 8.
Figure 10:
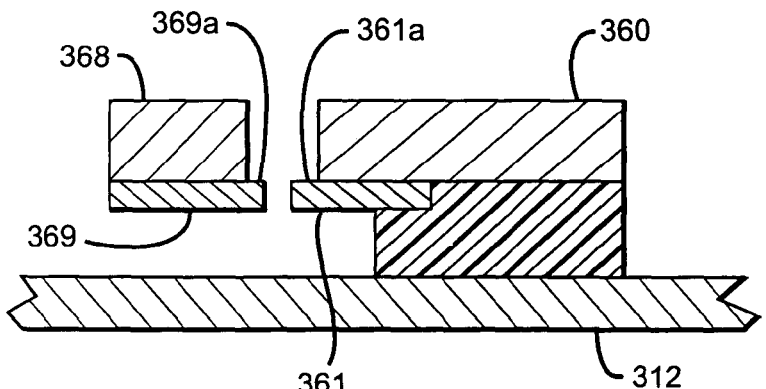
FIG. 10 is a side elevation view, in cross section, of the structure shown in FIG. 9 as seen along the line 10-10 in FIG. 9.
Figure 11:
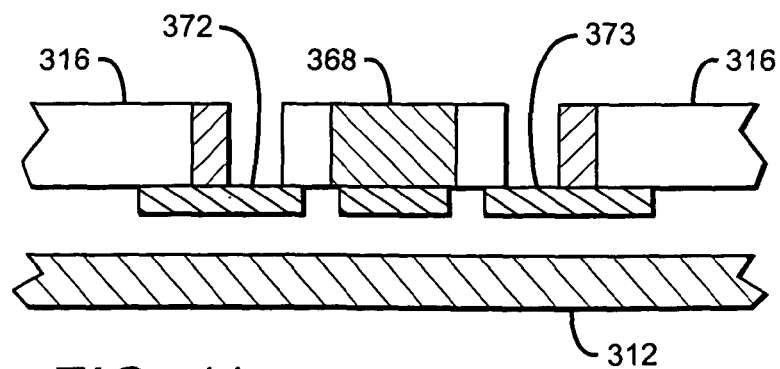
FIG. 11 is a side elevation view, in cross section, of the structure shown in FIG. 9 as seen along the line 11-11 in FIG. 9.

The patterned side of the wafer 250 is then adhesively bonded, for example, with an epoxy 266, to a substrate 268 of silicon, Vycor®, or the like. (FIG. 7c.) After bonding, the handle layer 252 and buried insulating layer 254 are removed and an electrically conducting layer 270, preferably of aluminum for the ease with which it may be patterned using RIE, is deposited on the exposed, upper surface of the device layer 256. (FIG. 7d.) The aluminum connection layer 270 may be 1.5 µm thick to minimize the electrical resistance of the current path. The aluminum and silicon MEMS device layers 270 and 256 are then patterned from the top using the same mask. (FIG. 7e.) After the aluminum layer 270 has been etched, the device layer 256 is etched using a DRIE process. These layers are patterned down to the insulating bridge 260 and the metal contacts 262 and 264. The removed portion of the device layer over the metal contacts is preferably wider, for example, by 1-2 µm, than the inner edges of the metal contacts to define the contact edge overhangs. The preferred overhangs of the metal contact are sufficiently large to compensate for typical through-wafer misalignments of about 0.5 µm. The final step (FIG. 7f) is the release etch in which an oxygen plasma etch is used to isotropically remove the adhesive bond from underneath the movable MEMS element(s).

FIGS. 8-11 show a practical example of a MEMS device in the form of a silicon-based, Lorentz force-actuated double-throw hybrid switch 300 that may be fabricated in accordance with the method illustrated in FIGS. 7a-7f.

The hybrid switch utilizes the Lorentz force, requiring an electrical current in the presence of a magnetic field, for actuation. The holding force is provided electrostatically, taking advantage of the negligible power consumption afforded thereby.

The MEMS switch 300 comprises a substrate 312 and a centrally located, electrically conductive, compliant actuator element or armature in the form of a suspension 314 carrying an arm 316 having ends 318 and 320 coupled to compliant arm-supporting suspension beams 322 and 324, respectively. The center suspension 314, the end suspensions 322 and 324 and the arm 316 are suspended over the substrate 312 and are movable laterally in unison relative thereto.

A pair of center blocks 326 and 328 anchor the ends of the suspension 314 to the substrate 312. Hence, the center portion of the suspension is free to deflect laterally (left or right). The left suspension 322 is suspended between fixed blocks 330 and 332, while the right suspension is similarly suspended between fixed blocks 334 and 336.

The passing of an electric current through the suspension 314 in the presence of a magnetic field provided by a permanent magnet oriented perpendicular to the plane of the drawing figure induces a Lorentz force causing the center portions of the suspensions 314, 322 and 324 to bend, thereby laterally translating the arm 316. The arm 316 may be displaced either to the left or to the right, depending on the relative directions of the magnetic field and the current flow vectors.

A pair of comb capacitors 338 and 340 straddle the arm 316 adjacent to the left end suspension 322. Similarly, a pair of comb capacitors 342 and 344 straddle the arm 316 adjacent to the right end suspension 324. Since the comb capacitors 338, 340, 342 and 344 are identical only the left comb capacitor 338 will be described. The comb capacitor 338 comprises a plurality of fixed capacitor plates 346 cantilevered from a capacitor block 348 and interleaved with a plurality of movable capacitor plates 350 projecting from the arm 316. The combination of the interleaved fixed and movable capacitor plates 346 and 350, appropriately powered electrically, forms an electrostatic device or drive providing the low power consumption holding force.

Disposed along the opposite sides of the center blocks 326 and 328 are pairs of spaced apart, stationary electrical terminals 360, 362 and 364, 366, each pair being connected to an external load or signal conducting circuit (not shown) via metal contacts formed from a metal layer deposited and patterned on the bottom side of device layer, as already described. Exemplary of those contacts are the contacts 361 and 363, preferably with contact overhangs 361*a* and 363*a*, respectively, shown in FIG. 9. The terminals 360, 362, 364 and 366 are fixed MEMS elements adhesively attached to the substrate 312.

A first transverse contact bar 368 is carried by the arm 316 and includes a metal contact 369 with contact edges 369*a* that preferably overhang the adjacent vertical side walls of the contact bar 368. The contact bar 368 is adapted to electrically couple the terminals 360 and 362 while a second transverse contact bar 370 carried by the arm 316 is adapted to electrically couple the terminals 364 and 366. The contact bars 368 and 370 are mechanically coupled to but electrically isolated from the arm 316 by means of insulating bridge pairs 372, 373 and 374, 375 respectively. The left contact bar 368 provides a switchable electrical connection between the associated terminals 360 and 362 when the suspension 314 is deflected towards the right by the Lorentz force. Conversely, the right contact bar 370 provides switchable electrical connection between the associated terminals 364 and 366 when the suspension 314 is deflected towards the left by the Lorentz force.

The contact bars 368 and 370 of the MEMS switch of FIGS. 8-11 are rigid, providing for two points of contact. More generally, since contact is made and broken laterally as opposed to vertically, the contacts can be readily patterned in multiple shapes and sizes by means of a simple mask design utilizing the double-sided MEMS device fabrication technique of the present invention.

Figure 12:
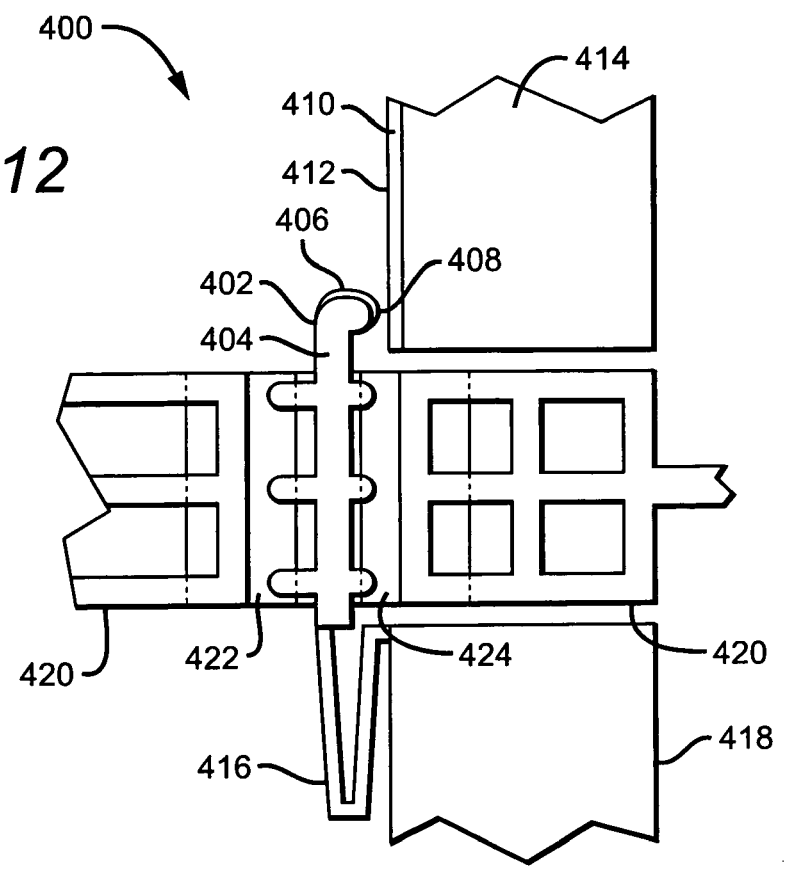
FIG. 12 is an enlarged top plan view of a portion of an alternative MEMS switch fabricated in accordance with the process of FIGS. 7a through 7f.

For example, with reference to FIG. 12, there is shown a one-point contact arrangement 400 comprising a contact bar 402 including a silicon body 404 formed in the device layer of a wafer. Attached to the lower surface of the body 404 is a patterned electrically conductive layer 406 having at one end of the contact bar a contact edge 408 that preferably overhangs the adjacent side walls of the body 404 and is adapted to engage an edge 410 of a contact layer 412 on the lower surface of a fixed terminal block 414. As before, the edge 410 is preferably overhanging. The conductive layer 406 at the other end of the contact bar 402 is electrically connected by means of a flexible coupling or tether 416 to a conductive layer formed on the bottom surface of a fixed terminal block 418 attached to the substrate by an adhesive bond layer. More specifically, the flexible coupling or tether 416 may comprise a U-shaped end of the layer 406 projecting from the body 404 and formed as a unitary extension of the current-conducting metal layer under the fixed terminal block 418. The body of the contact bar is attached to a movable arm 420 by a pair of insulating bridges 422 and 424 coplanar with the conductive layer 406 and formed as already described.

Movement of the arm 420 to the right as seen in FIG. 12 brings the contact edge 408 into electrical contact with the contact edge 410 to electrically couple the conductive layer 412 with that carried by the terminal block 418.

Figure 13:
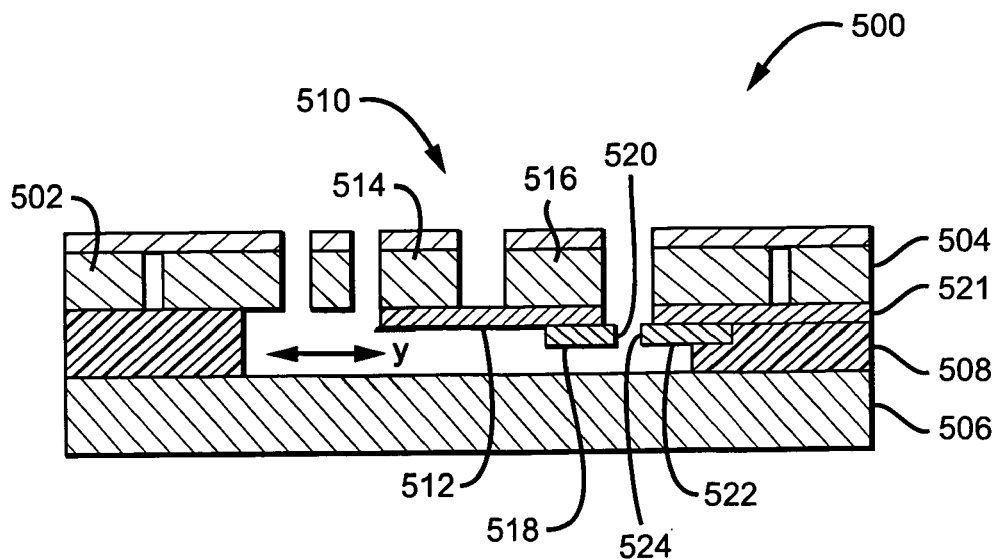
FIG. 13 is an end elevation view, in cross section, of another MEMS device fabricated in accordance with a further embodiment of the process of the present invention.

It will be readily apparent that the MEMS device 200 of FIG. 6 may take other forms, as shown, for example, in FIG. 13. FIG. 13 depicts a MEMS device 500 that is in most respects identical to the device 200. Thus, the MEMS device 500 of FIG. 13 includes a pair of stationary, outer conductive elements 502 and 504 bonded to a substrate 506 by an adhesive layer 508. An inner, movable MEMS element 510 is disposed between the pair of stationary elements 502 and 504, and includes an insulating support or bridge 512 carrying a pair of spaced apart, electrically conductive members 514 and 516 extending upwardly from the bridge. As before, the movable element 510 may comprise a structure that is supported at its distal ends by the substrate 506 so that the movable element is displaceable, in a horizontal or y direction relative to the substrate and the stationary elements 502 and 504. As in the case of FIG. 6, because the bridge 512 is formed of an insulating material such as silicone dioxide, the conductive members 514 and 516, although mechanically joined by the bridge, will be electrically isolated from each other.

Unlike the insulating bridge 212 in the MEMS device of FIG. 6, the insulating bridge 512 in the device 500 preferably extends across the entire width of the movable MEMS element 510. Formed on the lower surface of the insulating bridge 512 is a thin metal contact 518, preferably of gold, having a contact edge 520 that preferably overhangs the adjacent vertical side wall.

Also unlike the device of FIG. 6, the embodiment of FIG. 13 includes an insulating layer 521 disposed along the bottom surface of the stationary MEMS element 504. Formed along the lower surface of the insulating layer 521 is a thin, fixed, preferably gold metal contact 522 coplanar with the movable contact 518 and having an edge 524, preferably overhanging, confronting the edge 520. The contacts 518 and 522 are so positioned that the overhanging edge 520 of the movable contact will engage the overhanging edge 524 of the fixed contact when the movable MEMS element is moved to the right, as seen in FIG. 13.

The fabrication of the MEMS device of FIG. 13 may utilize the basic process steps illustrated in FIGS. 7*a*-7*f*, as will be evident to those skilled in the art.

While particular embodiments of the invention have been shown and described, numerous variations and alternate embodiments will occur to those skilled in the art. Accordingly, it is intended that the invention be limited only in terms of the appended claims.

We claim:

1. A method of fabricating a MEMS device including a stationary element and a movable element displaceable relative to the stationary element, the method comprising the steps of:

depositing and patterning on one side of a wafer a layer of material having a preselected electrical resistivity;

bonding a substrate to said one side of said wafer using an adhesive bonding agent, said substrate overlying said patterned layer of material;

selectively removing portions of said wafer from the side opposite said one side to define the stationary and movable MEMS elements; and selectively removing said adhesive bonding agent to release said movable MEMS element, at least a portion of said patterned layer of material being disposed so as to be attached to said movable MEMS element, said layer of material of preselected resistivity comprising an electrically conductive material patterned to define a first portion attached to said movable MEMS element and a second portion attached to said stationary MEMS element, said first portion being exposed upon said selective removal of said adhesive bonding agent.

2. The method of claim 1 in which:

the movable MEMS element includes spaced-apart members, said first portion of said electrically conductive material defining a bridge mechanically coupling said members.

3. The method of claim 1, further comprising the step of:
depositing an electrically conductive layer on said side opposite said one side of said wafer and wherein the step of selectively removing portions of said wafer from said side opposite said one side is preceded by a step of selectively removing corresponding portions of said electrically conductive layer.

4. The method of claim 3 in which:
the electrically conductive layer comprises a metal selected from the group consisting of the noble metals, aluminum, copper, nickel, titanium, tantalum and niobium.

5. The method of claim 3, in which:
said electrically conductive layer comprises aluminum and said selective removal of portions of said wafer and said conductive layer is performed using a reactive ion etch.

6. The method of claim 1, in which:
said substrate comprises an insulating material.

7. The method of claim 6, in which:
said substrate material is selected from the group consisting of glass, silicon, high resistivity silicon, crystalline sapphire, crystalline silicon, polycrystalline silicon, silicon carbide, alumina, aluminum nitride, gallium arsenide, silicon dioxide, silicon nitride and silicon oxynitride.

8. The method of claim 1, in which:
said substrate comprises an electrically conducting material.

9. The method of claim 1, further comprising the step of:
fabricating electronic circuit elements on said wafer.

10. The method of claim 1, further comprising the step of:
fabricating electronic circuit elements on said substrate.

11. The method of claim 1, in which:
the step of etching the adhesive bonding agent is performed using an oxygen plasma etch.

12. The method of claim 1, in which:
said adhesive bonding agent comprises an organic adhesive.

13. A method of fabricating a MEMS device including a stationary element and a movable element displaceable relative to the stationary element, the method comprising the steps of:
providing a silicon-on-insulator wafer comprising a silicon handle layer, a buried insulating layer and a silicon device layer, said device layer having a top surface and a bottom surface;
depositing and patterning on the bottom surface of said device layer a layer of material having a preselected electrical resistivity;
bonding a substrate to said bottom surface of said device layer using an adhesive bonding agent, said substrate overlying said patterned layer of material;
removing said handle and buried insulating layers to expose the top surface of said device layer;
selectively removing portions of said device layer from the top surface thereof to define the stationary and movable MEMS elements; and
selectively removing said adhesive bonding agent to release said movable MEMS element, at least a portion of said patterned layer of material being disposed so as to be attached to said movable MEMS element, said layer of material of preselected resistivity comprising an electrically conductive material patterned to define a first portion attached to said movable MEMS element and a second portion attached to said stationary MEMS element, said first portion being exposed upon said selective removal of said adhesive bonding agent.

14. The method of claim 13 in which:
the movable MEMS element includes spaced-apart members, said first portion of said electrically conductive material defining a bridge mechanically coupling said members.

15. The method of claim 13 in which:
said electrically conductive layer is formed over an insulating layer deposited and patterned on said bottom surface of said device layer.

16. The method of claim 13 in which:
said electrically conductive material comprises a metal selected from the group consisting of the noble metals, tantalum, niobium, titanium, nickel, aluminum and copper.

17. The method of claim 13, further comprising the step of:
etching alignment marks through said device layer.

18. The method of claim 13, in which:
said step of removing said handle and buried insulating layers is performed using a dry etch, a wet etch or a mechanical grind, or any combination thereof.

19. The method of claim 18, further comprising the step of:
depositing an electrically conductive layer on the top surface of said device layer after removing said handle and buried insulating layers.

20. The method of claim 19 in which:
the conductive layer comprises a metal selected from the group consisting of aluminum, copper, gold, platinum, silver, nickel, titanium and tantalum.

21. The method of claim 19, further comprising the step of:
selectively removing said conductive and device layers to define said stationary and movable MEMS elements.

22. The method of claim 21, in which:
said conductive layer comprises aluminum and said selective removal of said conductive and device layers is performed using a reactive ion etch.

23. The method of claim 13, in which:
said substrate comprises an insulating material.

24. The method of claim 23, in which:
said substrate material is selected from the group consisting of glass, silicon, high resistivity silicon, crystalline sapphire, crystalline silicon, polycrystalline silicon, silicon carbide, alumina, aluminum nitride, gallium arsenide, silicon dioxide, silicon nitride and silicon oxynitride.

25. The method of claim 13, in which:
said substrate comprises an electrically conducting material.

26. The method of claim 13, further comprising the step of:
fabricating electronic circuit elements on said wafer.

27. The method of claim 13, further comprising the step of:
fabricating electronic circuit elements on said substrate.

28. The method of claim 13, in which:
the step of etching the adhesive bonding agent is performed using an oxygen plasma etch.

29. The method of claim 13, in which:
said adhesive bonding agent comprises an organic adhesive.

* * * * *